United States Patent
Li et al.

(10) Patent No.: US 9,550,476 B2
(45) Date of Patent: Jan. 24, 2017

(54) ELECTRIC DRIVE UNIT FOR A CORNER STEADY

(75) Inventors: Xian Wei Li, Hangzhou (CN); An Dong Chen, Hangzhou (CN); Jun Qiang Wang, Hangzhou (CN)

(73) Assignee: Carman Enterprise Co., Ltd. (CN)

( * ) Notice: Subject to any disclaimer, the term of this patent is extended or adjusted under 35 U.S.C. 154(b) by 1099 days.

(21) Appl. No.: 13/343,878

(22) Filed: Jan. 5, 2012

(65) Prior Publication Data

US 2013/0008269 A1  Jan. 10, 2013

(30) Foreign Application Priority Data

Jan. 25, 2011  (EP) .................................... 11151995

(51) Int. Cl.
*B60S 9/18*  (2006.01)
*B60S 9/06*  (2006.01)

(52) U.S. Cl.
CPC ............. *B60S 9/06* (2013.01); *Y10T 74/18664* (2015.01)

(58) Field of Classification Search
CPC ................. B60S 9/04; B60S 9/06; B60S 9/08; B60S 9/16; Y10S 254/02; Y10S 254/01; B60D 1/465; B60D 1/66; F16H 25/2015
USPC .......... 254/418, 419, 420, 424, 425; 361/23; 192/141, 142 R, 143, 150
See application file for complete search history.

(56) References Cited

U.S. PATENT DOCUMENTS

| | | | | |
|---|---|---|---|---|
| 1,890,972 A | * | 12/1932 | Davis ............................ | 254/419 |
| 1,891,517 A | * | 12/1932 | Williams ...................... | 254/419 |
| 3,854,750 A | * | 12/1974 | Voehringer, Jr. .......... | 280/764.1 |
| 4,067,543 A | | 1/1978 | Orth | |
| 4,103,869 A | * | 8/1978 | Mesny et al. ................ | 254/425 |
| 5,348,330 A | * | 9/1994 | Few et al. .................... | 280/475 |
| 5,501,428 A | * | 3/1996 | Garceau ........................ | 254/424 |
| 8,360,397 B2 | * | 1/2013 | Watanabe ...................... | 254/98 |

FOREIGN PATENT DOCUMENTS

| | | |
|---|---|---|
| EP | 1088722 A2 | 4/2001 |
| WO | WO-01/62563 A1 | 8/2001 |

* cited by examiner

*Primary Examiner* — Lee D Wilson
(74) *Attorney, Agent, or Firm* — Barnes & Thornburg LLP

(57) ABSTRACT

An overload protection in a drive unit for a steady or jack for a caravan comprises an electro-mechanical control system. A spindle is driven by a motor through a gearbox, wherein the motor is controlled through a power supply. A control device in the system comprises a movable part slidably seated on an output shaft of the gearbox, where the movable part is connected with the spindle. Movement between the shaft and the sliding part is counteracted by springs. The slidable part is provided with actuating points that may contact switches by axial movements. When a nut on the spindle reaches an end position, a reactive force in the spindle will cause the part to move against the force of springs, eventually actuating a switch and thereby causing interruption of the circuit, thereby protecting motor and engagement between nut and spindle from electric and mechanical overload.

11 Claims, 5 Drawing Sheets

ELECTRIC DRIVE UNIT FOR A CORNER STEADY

FIELD OF THE INVENTION

The present invention relates to a drive unit for an electrically operated corner steady for a trailer vehicle, for example a caravan. The invention also relates to control system for such a drive unit and to a corner steady fitted with a drive unit according to invention.

By a steady is meant an extendable support leg used for stabilising a trailer vehicle and for levelling the trailer on uneven ground, in that one steady is provided at each corner of the trailer at the downwardly facing bottom of the trailer.

BACKGROUND OF THE INVENTION

Electrically operated corner steadies are widely used in modern caravans with remote-controlled drive units. Examples of electrically powered corner steadies are disclosed in U.S. Pat. No. 4,103,869 and EP 1 257 450. A battery in the caravan powers a DC electric motor through an electric circuit in each drive unit. The output shaft of the electric motor is connected to the screw spindle which is provided with a moving nut for actuating and moving a support leg of the steady between a folded rest position and an extended support position of the leg. The nut is usually linked to one end of an arm or strut which in turn is linked at its opposite end to the support leg.

When the leg reaches an extreme position, for example the folded rest position, or the nut reaches the end of the thread of the spindle, the nut cannot move any farther on the spindle. However, normally power is continuously supplied to the motor resulting in continuous rotation of spindle and a steep rise in torque in the spindle due to the power characteristic of the electric motor. At these positions, the friction between nut and spindle may become so high that nut will get stuck on the thread of spindle as the spindle is still forced to rotate by the motor, eventually locking the nut on the spindle. If the spindle becomes stuck at these positions, the nut/spindle engagement may be locked such that the motor cannot overcome the friction and release the spindle from the locked engagement by reversing the direction of rotation of the spindle. If this situation arises, the motor and thus the drive unit of corner steady will fail.

A known solution to this problem is to provide the motor with an overload protection such that when current through the motor exceeds a predetermined value, the power supply is interrupted. However, in order for the overload protection to have time to react when the nut reaches an end position or cannot move for other reasons, the spindle is provided with a low rotational speed by the motor/gearbox which in turn results in an extended time for moving the support leg. This extended operational time for moving the leg is of course not desirable.

ASPECTS OF THE INVENTION

An aspect of the invention is to provide an overload-protected drive unit for an electrically operated steady for a trailer vehicle, where the support leg can be operated at higher speed than by the prior art without risking the nut getting stuck on the spindle when reaching an extreme position or overloaded in other ways. Another aspect of the invention is to provide a control system for a drive unit for an electrically operated steady that avoid the drawbacks of the prior art.

DESCRIPTION OF THE INVENTION

The drive unit according to the invention includes a control system incorporating a control device which is inserted in the transmission between the output shaft of the gearbox and a proximate end of the spindle, the control device including:
  an arrangement of parts between the output shaft and the proximate end of the spindle, the arrangement allowing limited mutual displacement between parts connected with the output shaft and parts connected with the proximate end of the spindle,
  switching means in the electric circuit and arranged at the parts in such a way that when the parts reach at least one extreme position of their mutual displacement, the switching means will be actuated due to displacement caused by increasing torque in the spindle and thus interrupt the power supply to the motor.

The control system according to the invention is peculiar by a control device which is inserted in the transmission between the output shaft of the gearbox and a proximate end of the spindle, the control device including:
  an arrangement of parts between the output shaft and the proximate end of the spindle, the arrangement allowing limited mutual displacement between parts connected with the output shaft and parts connected with the proximate end of the spindle,
  switching means in the electric circuit and arranged at the parts in such a way that when the parts reach at least one extreme position of their mutual displacement, the switching means will be actuated due to displacement caused by increasing torque in the spindle and thus interrupt the power supply to the motor.

The inventive drive unit and control system may be with or without a separate overload protection that disconnects the power supply to the motor if the current in the electric circuit exceeds a threshold value. In the following, such a separate overload protection is not considered when applying the invention.

According to the invention, if the torque increases in the spindle due to some kind of obstruction, this will cause the parts to be displaced relative to each other and/or exert a pressure between the parts. The parts may be arranged such that their mutual displacement occurs as a rotational movement, and switching and interruption of the electric circuit occurs when a predetermined torque between the output shaft and the proximate end of the spindles is exceeded. A resistance in the switching means may provide that the switching means are not actuated unless the predetermined torque is exceeded.

It is preferred that the displacement between the parts of the control system in the inventive drive unit is axial. It is thus possible that the parts of the control system include:
  a first part fixed to the output shaft and a second part fixed to the proximate end of the spindle, the first and second parts being mutually displaceable in axial direction while simultaneously being rotationally interlocked so that torque can be transmitted to the spindle from the output shaft and vice versa;
  a third part which is connected with the spindle so as to follow axial displacements of the spindle while allowing rotation of the spindle relative to the third part, the third part provided with at least one actuating point for actuating the switching means, the switching means being fixed in relation to the gearbox and the output shaft.

In this embodiment, when the movement of the nut along the spindle is obstructed or is prevented by moving in some way, the torque transmitted to the spindle from the output shaft will induce a reactive force in axial direction of the spindle, either towards the output shaft or away from the output shaft. This is due to the screw thread by which the spindle engages the nut. This reactive force will then cause a displacement between the first part at the output shaft and the second part at the proximate spindle end, and the third part which is moving together with the spindle will cause actuation of the switching means, thus interrupting the electric circuit and the power supply to the motor.

A simple embodiment of the configuration of the first and second parts in the control device is designed such that the first part of the control unit includes a radial projection, e.g. a key, on the output shaft, and the second part of the control unit includes a groove adapted for receiving the key and allowing axial displacements between the projection and the groove.

In order for the drive unit to overcome loads that are not critical, e.g. caused by some unexpected friction on the thread of the spindle, and without stopping the rotation of the spindle and thus the movement of the support leg, the control device may include resilient means arranged to counteract the displacement between the first and second parts. The resilient means are then adapted only to yield enough for actuating the switching means if the load on the spindle and thereby the torque exceeds a critical value.

The resilient means may be two spaced sets of disk springs which are mounted on the output shaft at opposite sides of the radial projection, and where the second part includes an annular member incorporating the groove and disposed between the sets of disk springs. Disk springs are of simple and sturdy mechanical design and do not take up much space compared to their high elastic modulus.

Since the travel of the nut is not only limited at one end when the support leg is folded up in the corner steady, but will also reach a limit at the other end of the thread of the spindle, it is possible that the control system is arranged with dual switching action by opposite displacements of the first and second parts. In such an embodiment, the third part of the control unit includes two oppositely directed actuating points, preferably facing each other, along a line approximately in parallel with the rotary axis of the output shaft, and where two oppositely facing switching means are disposed between the actuating points so that displacement of the third part along the rotary axis of the output shaft and relative to the output shaft will cause either actuating point to actuate a respective switching means.

When the drive unit and control system is activated at one extreme position of the nut on the spindle, thus interrupting the power supply to the motor, it is desirable to reverse the rotation of the spindle so as to rotate the spindle in the opposite direction and move the nut and the support leg accordingly. This may be provided in an embodiment wherein the control system includes a rectifier diode provided in the electric circuit and connected in parallel with the switching means. After interrupting the DC current conducted in one direction for rotating the spindle in a first rotary direction, the DC current may be conducted the opposite direction and bypass the switching means through the rectifier diode while retaining interruption of the current in the direction that caused stopping of the spindle.

In the embodiment with two oppositely acting switching means, the inventive drive unit and control system are adapted such that the electric circuit includes two switching means arranged for interrupting the power supply to the electric motor by opposite displacements of the parts of the control system at two opposing extreme positions of the parts. Two rectifier diodes are provided in the control circuit in parallel with the switching means, one rectifier diode arranged at each switching means, and the rectifier diodes are arranged such that their directions of rectification of the current in the electric circuit are in mutually opposite directions. The drive unit may then be operated to reverse the movement of the support leg if the current is interrupted in either direction of rotation of the spindle.

An electrically operated corner steady for a trailer vehicle, e.g. a caravan, where a support leg of the steady may be operated by a drive unit according to the invention is also part of the invention.

DESCRIPTION OF THE DRAWING

Embodiments of the invention will now be described in detail with reference to the enclosed drawings, in which.

DETAILED DESCRIPTION OF EMBODIMENTS OF THE INVENTION

Figure 1:
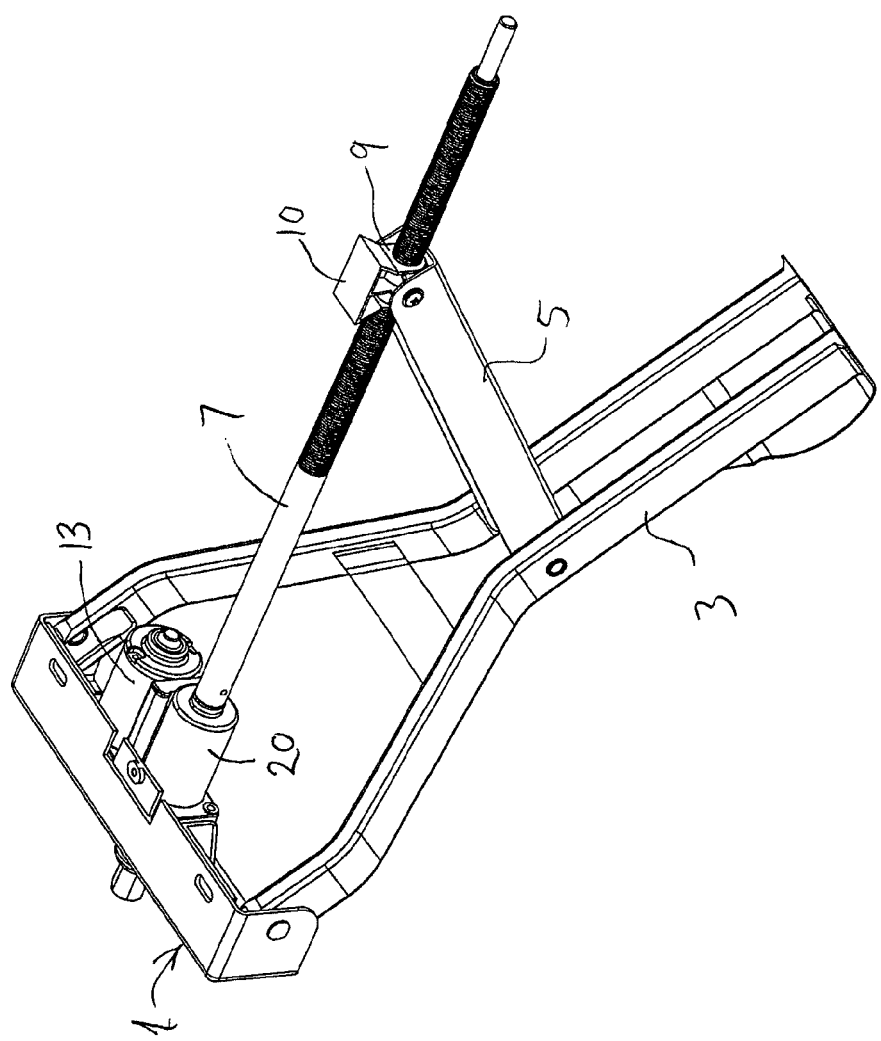
FIGS. 1 and 2 shows different perspective views of corner steady provided with an embodiment of a drive unit according to the invention in extended and folded condition, respectively.

A corner steady for a caravan or other trailer vehicle in the present embodiment is composed of main structural parts 1, 3 and 5, namely a support holder 1, a pivotable support leg 3 and an arm 5. The support holder 1 is mounted at the bottom side of the caravan. A screw spindle 7 is seated in the support holder 1 at one end while its opposed threaded end engages a nut 9 to which an upper end of the arm 5 is pivotably linked. When the spindle 7 is rotated, the nut 9 moves back and forth on the spindle 7, consequently lowering or lifting the lower end of the support leg 3. The nut 9 is provided with a guide member 10 which runs in a not shown guide fitted at the bottom of the caravan.

Figure 2:
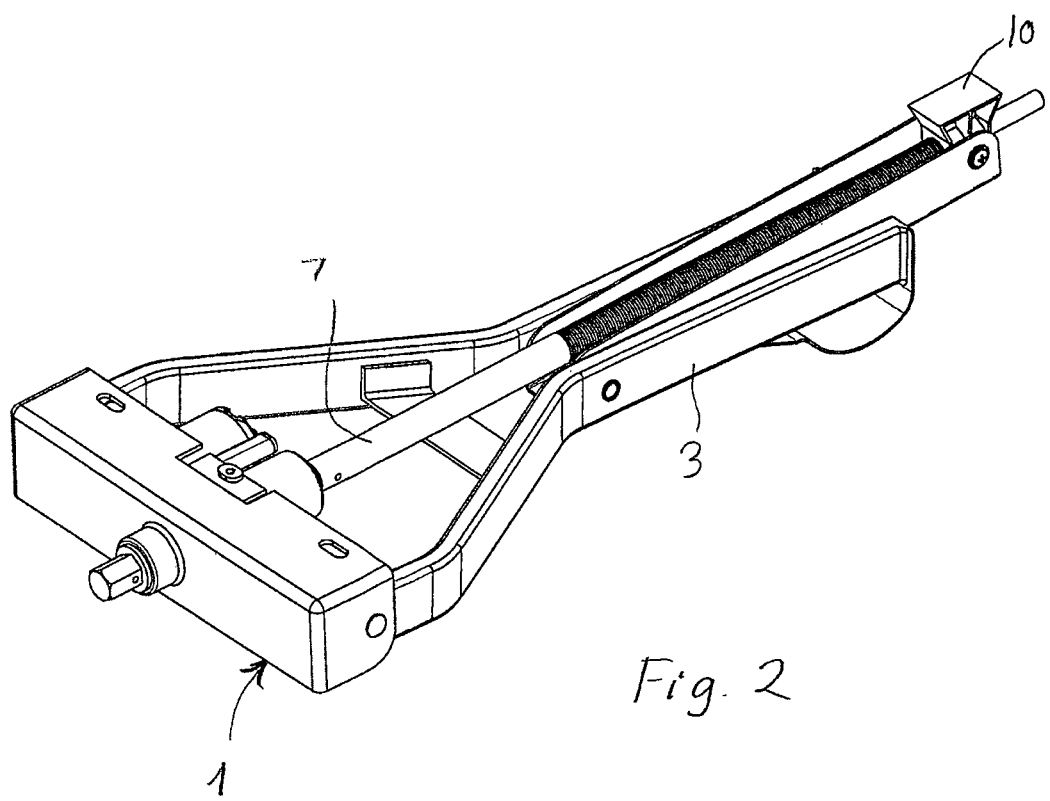
Figure 3:
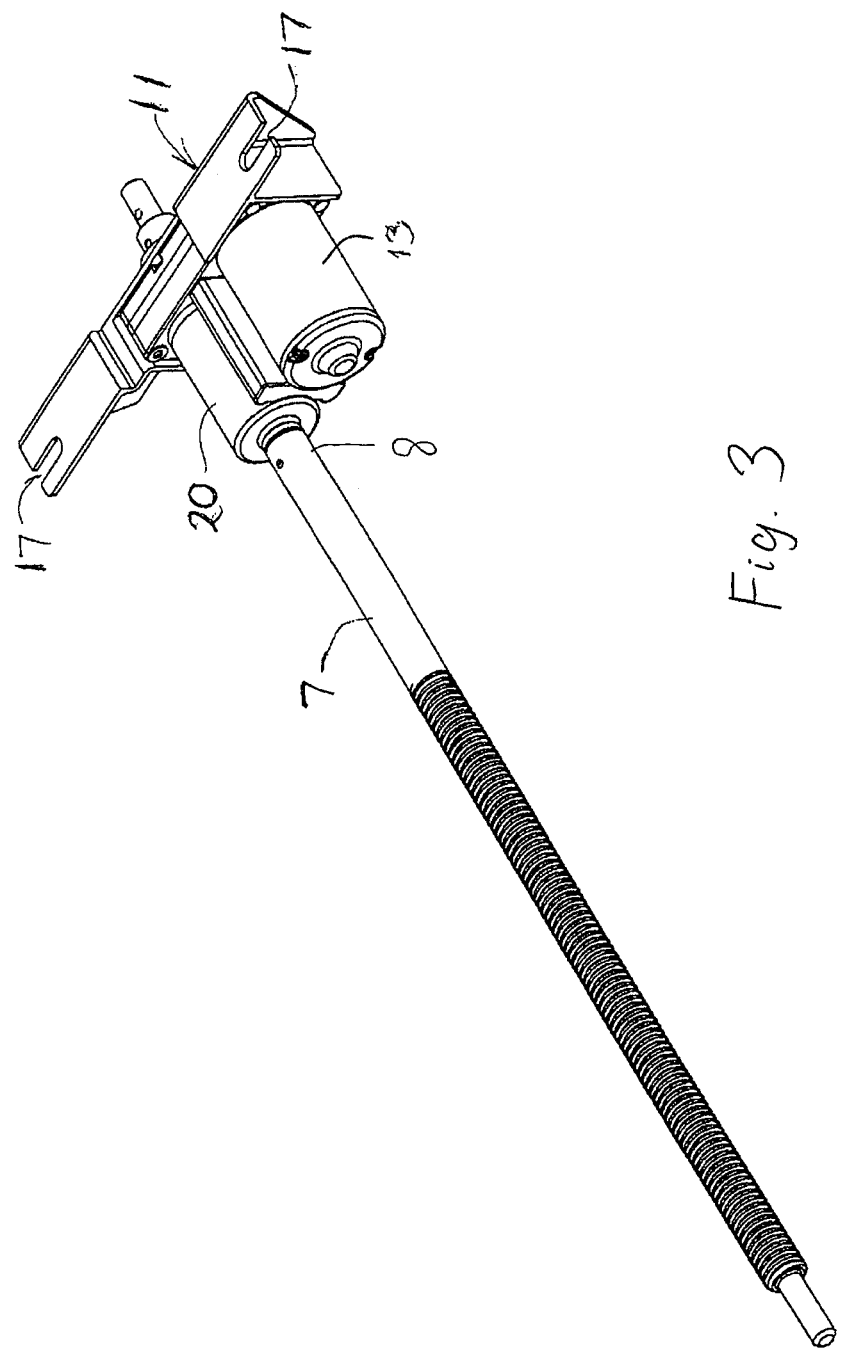
FIG. 3 shows the drive unit of FIGS. 1 and 2 as a separate part in perspective view.
Figure 4:
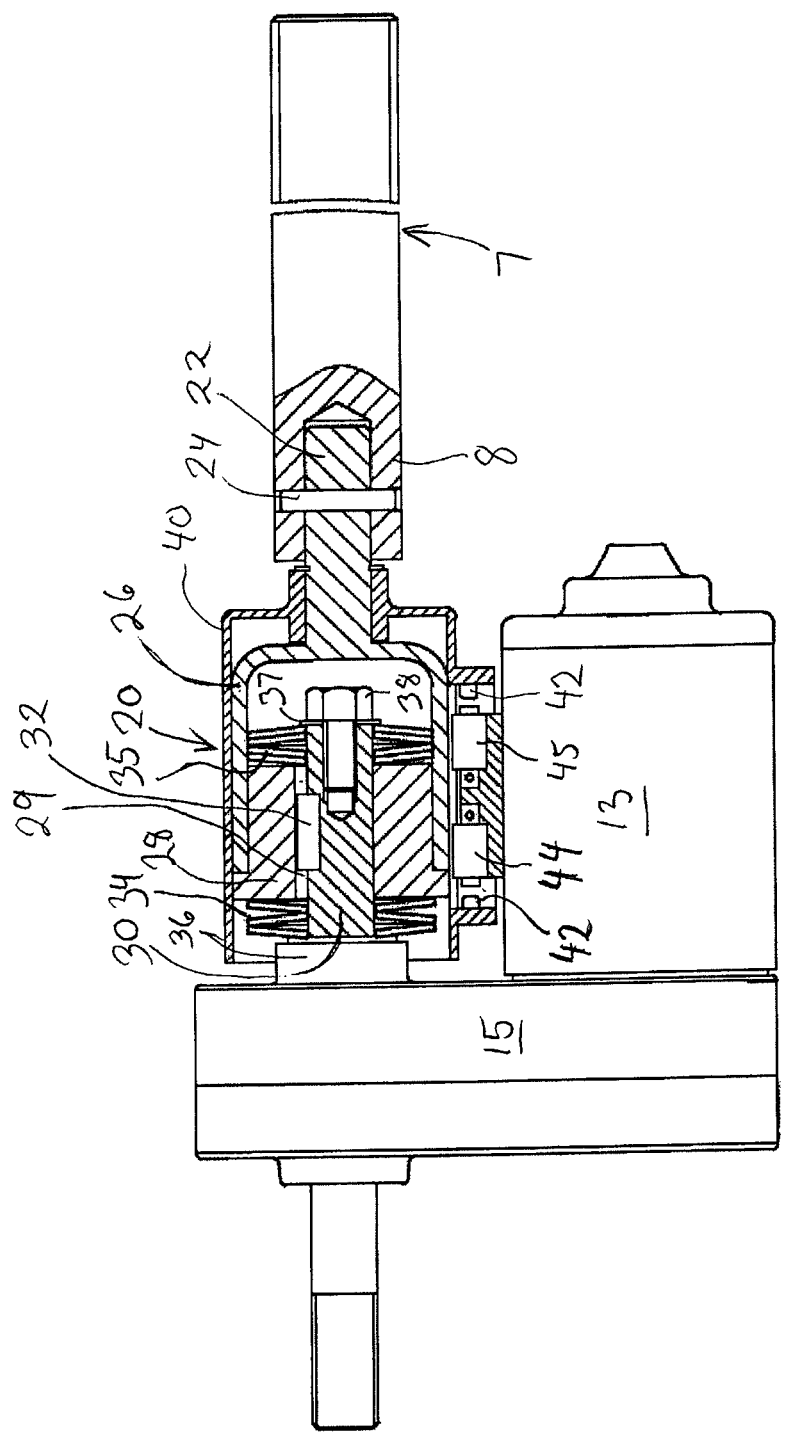
FIG. 4 shows a sectional view of a detail of the drive unit of FIG. 4.

Turning to FIG. 3, a preferred embodiment of the drive unit according to the invention is shown separately. It appears with a bracket 11 on which is mounted a DC motor 13 and the screw spindle 7. A gearbox 15, hidden on FIG. 3 but shown on FIG. 4, provides transmission and gearing between the motor 13 and the spindle 7. A control device 20 which is part of the inventive control system according to the invention is provided at one end of the spindle 7 and beside the motor 13. This unit may be provided as an accessory for retrofitting on existing manually operated corner steadies by removing an existing spindle and mounting the drive unit according to the invention under the support holder 1 as screws are passed through the apertures 17 on the bracket 11 and into the upper side of the support holder 1. The drive unit according to the invention may of course also be applied in production of factory-made corner steadies and provided from the supplier as shown on FIGS. 1 and 2.

Turning to FIG. 4, this shows the essential mechanical components of an embodiment of the control system according to the invention. Here, the proximate end 8 of the spindle 7 is shown connected with a shaft end 22 of the control device 20 by a traversing pin 24. The shaft end 22 continues into an either forked or cup-like extension 26 extending around an output shaft 30 of the gearbox 15. The extension 26 is secured to an annular part 28 provided with a central bore which slidingly receives the output shaft 30 such that the annular part 28 can be displaced in axial direction in relation to the output shaft 30. By "axial direction" is meant a direction parallel with the rotary axis of the output shaft 30. A key 32 or projection is provided on the output shaft 30 and received in a groove 29 extending axially in the bore of the annular part 28. The rotation and torque from the output shaft 30 is thus transmitted without play to the annular part 28 and then to the spindle 7. Axial movement of the spindle 7 relative to output shaft 30 will thus be transmitted to shaft end 22 and on to the part 28 which will be displaced in relation to the output shaft 30.

Two sets of disk springs 34, 35 are provided around the output shaft 30. A first set 34 is provided between the annular part 28 and a shoulder 36 on the gearbox 15, and a second set of disk springs 35 is provided between the annular part 28 and a washer 37 secured by a screw 38 at the free end of the output shaft 30. Mutual displacements between output shaft 30 and spindle 7 in either direction are thereby limited and counteracted by the disk springs 34, 35.

A holder 40, which appears substantially cup-shaped, is provided with actuating points 42 is seated on the shaft end 22 such that the holder 40 can rotate on the shaft end 22, but cannot move in axial direction in relation to the shaft end 22. Any relative movement by the spindle 7 is thus transmitted to the holder 40 and the actuating points 42. The holder 40 encloses partially the springs 34, 35, extension 26 and annular part 28, thus acting as a protection against dirt and water that otherwise would enter the moving parts of the device. On FIG. 4, the actuating points 42 are disposed along a line in axial direction and facing each other at the side of the holder 40 closest to the motor 13. Protruding into the space between the actuating points 42 is provided a socket arranged with oppositely directed electric switches 44, 45. This arrangement is adapted such that associated switches 44, 45 may be actuated by respective actuating points 42 on the holder 40. The switching action is provided as the socket with switches 44, 45 is secured to the exterior of the motor 13 which in turn is axially fixed in relation to the output shaft 30 through the gearbox 15.

Figure 5:
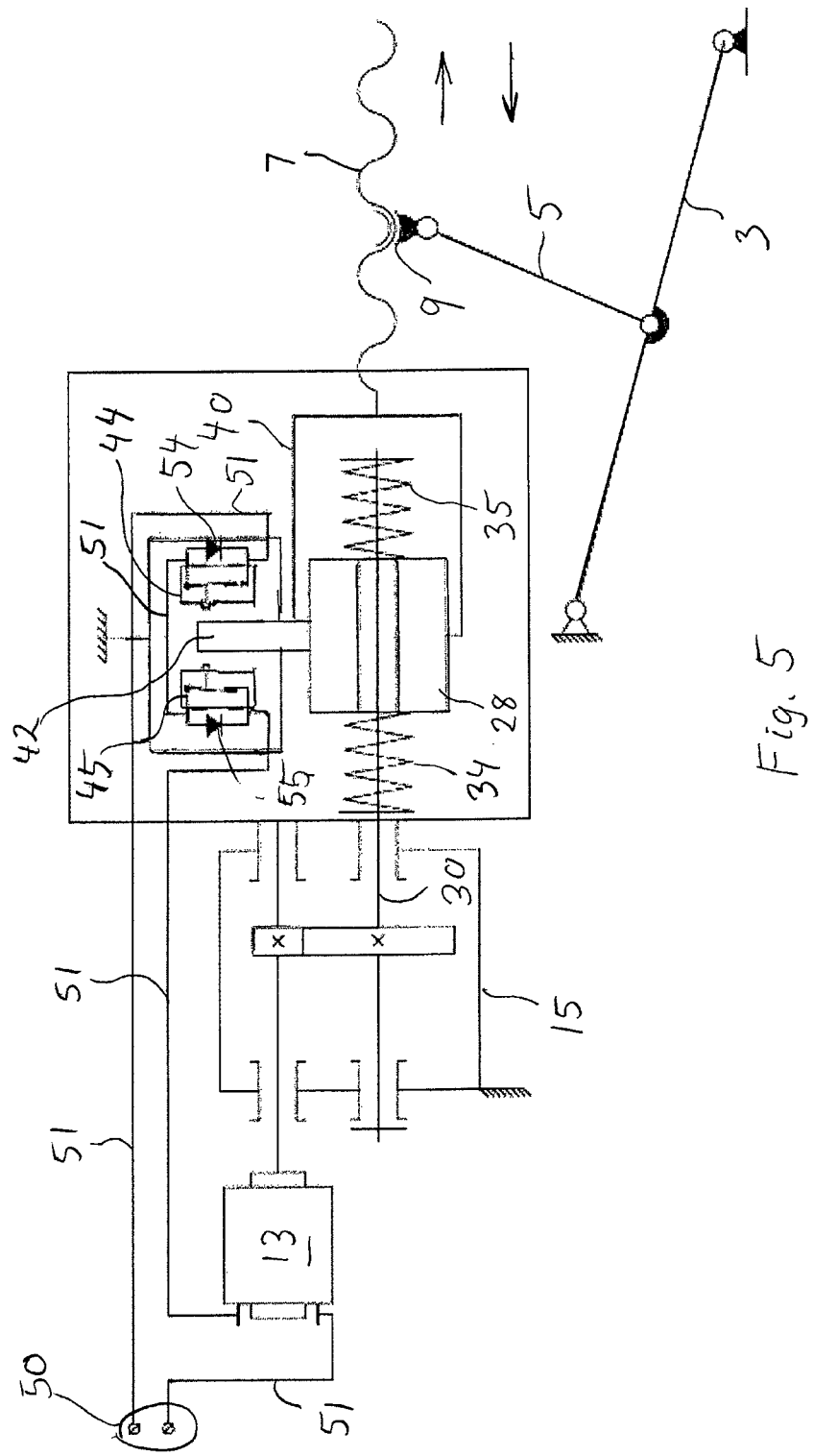
FIG. 5 is a schematic diagram showing the function of the control system according to the invention.

Turning to the schematic diagram on FIG. 5, the circuitry of the preferred embodiment of the control system will now be explained.

The power supply for the DC electric motor 13 is provided by a not shown battery and controlled by a handheld remote control or a control panel, which are well-known elements within the industry. The DC power supply is here designated by poles 50 which may be switched in polarity by an operator to provide DC voltage to the motor 13 in opposite directions in the wires 51 of the circuit for making the motor 13 and spindle 7 rotate in respective opposing directions.

The switches 44 and 45 are here shown physically positioned as facing each other in contrast to the embodiment on FIG. 4, but the function is the same. Similarly, the actuating points 42 are depicted in FIG. 5 as a single projection 42, which also indicates possible variants within the scope of the invention.

When operating freely, the current initiated by the poles 50 will run through the circuit wires 51, through the closed switches 44 and 45 and through the motor 13. When the projection or actuating points 42 move as far as they may go in any axial direction, one of the points 42 will actuate a switch 44 or 45.

In order to provide a reverse operation of the spindle 7, the electric circuit includes rectifier diodes 54 and 55; the diodes 54, 55 are provided in the electric circuit in parallel with the switches 44, 45, respectively, however with their directions of rectification of the DC current in opposite directions.

The above described embodiment of the drive unit and control system according to the invention may operate as follows.

When the spindle 7 is made to rotate in a first direction, for example such that the nut 9 moves to the right on FIG. 1, causing the leg 3 to fold up under the caravan to the position on FIG. 2, the nut 9 will reach an extreme end position where it can go no further. This means that the resistance caused by the nut 9 not being able to move anymore will induce a reactive force in the spindle 7 towards the control device 20. The reactive force will be transmitted to the shaft end 22 and then to the annular part 28, cf. also FIG. 4. Since the annular part 28 is seated sliding along the output shaft 30, the reactive force will be transmitted to the set of disk springs 34 abutting on the shoulder 36 on the gearbox 15, and the disk springs 34 will yield. If the reactive force is strong enough, the actuating point 42 facing to the left will reach the switch 45, causing the current in the circuit 51 to be interrupted and the motor 13 will stop, thereby protecting the motor 13 from power overload and protecting the spindle 7 from frictional locking to the nut 9 due to excessive torque.

In this situation, where the motor 13 is stopped, the rectifier diode 55 in parallel with the switch 45 is arranged such that the electric current is prevented from flowing in the direction that will cause further rotation of the spindle 7 in the first direction and from moving the nut 9 further to the right on FIGS. 1 and 2. However, the rectifier diode 55 is thereby arranged to allow the electric current to flow in the opposite direction in the circuit 51. Therefore, by using the manual control buttons on e.g. a not shown remote control unit, motor 13 and spindle 7 can be reversed to rotate in a second direction by switching the polarity of the poles 50, making the current in the circuit 51 flow in the opposite direction allowed by the rectifier diode 55. The nut 9 may then be moved away from the extreme position on FIG. 2 and towards the control device 20, thereby lowering the leg 3 again.

It is obvious that continuous rotation of the spindle 7 in the second direction will eventually make the nut 9 reach an opposite extreme position where the annular part 28 is pressing against the other set of springs 35, causing the actuating points 42 facing to the right actuate the switch 44 and interrupting the circuit 51 in an analogous manner.

The rectifier diode 54 serves the same purpose as the diode 55, only working in the opposite direction of flow of the current in the circuit 51.

By proper dimensioning, the springs 34, 35 will be strong enough to resist the movement of the annular part 28 relative to the output shaft 30 so that any non-critical resistance caused by the load on the leg 3 when it bears on the ground, or by dirt or corrosion on the spindle 7 or by other accidental impediments will be overcome without interrupting the current to the motor 13.

The invention claimed is:

1. A drive unit for an electrically operated steady for a trailer vehicle having a support leg, the drive unit including:
   a screw spindle provided with a nut for actuating and moving the support leg of the steady between a folded rest position and an extended support position of the leg, where the spindle is connected to an output shaft of a gearbox, the gearbox being drivingly connected with an electric motor energised by a DC power supply through an electric circuit, and a control system incorporating a control device which is inserted between the output shaft of the gearbox and a proximate end of the spindle, the control device including an arrangement of parts between the output shaft and the proximate end of the spindle, the arrangement allowing limited mutual displacement between parts connected with the output shaft and parts connected with the proximate end of the spindle, a first switch in the electric circuit and arranged at the parts in such a way that when the parts reach at least one extreme position of their mutual displacement, the first switch will be actuated due to displacement caused by increasing torque in the spindle and thus interrupt the power supply to the motor.

2. A drive unit according to claim 1, wherein the parts include a first part fixed to the output shaft and a second part fixed to the proximate end of the spindle, the first and second parts being mutually displaceable in axial direction while simultaneously being rotationally interlocked so that torque can be transmitted to the spindle from the output shaft and vice versa;

a third part which is connected with the spindle so as to follow axial displacements of the spindle while allowing rotation of the spindle relative to the third part, the third part provided with at least one actuating point for actuating the first switch, the first switch being fixed in relation to the gearbox and the output shaft.

3. A drive unit according to claim 2, wherein the first part of the control device includes a radial projection on the output shaft, and the second part of the control device includes a groove adapted for receiving the projection and allowing axial displacements between the projection and the groove.

4. A drive unit according to claim 3, wherein the control device includes resilient members arranged to counteract the displacement between the first and second parts.

5. A drive unit according to claim 4, wherein the resilient members are two spaced sets of disk springs which are mounted on the output shaft at opposite sides of the radial projection, and where the second part includes an annular member incorporating the groove and disposed between the sets of disk springs.

6. A drive unit according to claim 2, wherein the third part of the control device includes two oppositely directed actuating points, preferably facing each other, along a line approximately in parallel with the rotary axis of the output shaft, wherein the first switch and an oppositely facing second switch are disposed between the actuating points so that displacement of the third part along the rotary axis of the output shaft and relative to the output shaft will cause either actuating point to actuate a respective first or second switch.

7. A drive unit according to claim 1, wherein the control system includes a rectifier diode provided in the electric circuit and connected in parallel with the first switch.

8. A drive unit according to claim 7, wherein the electric circuit includes a second switch, the first switch and the second switch arranged for interrupting the power supply to the electric motor by opposite displacements of the parts of the control system at two opposing extreme positions of the parts, where two rectifier diodes are provided in the control circuit in parallel with the first and second switches, one rectifier diode arranged at each of the first and second switches, where the rectifier diodes are arranged such that their directions of rectification of the current in the electric circuit are in mutually opposite directions.

9. A control system for a drive unit for an electrically operated steady for a trailer vehicle including a screw spindle provided with a nut for actuating and moving a support leg of the steady between a folded rest position and an extended support position of the leg, where the spindle is connected to an output shaft of a gearbox, the gearbox being drivingly connected with an electric motor adapted to be energised by a DC power supply, the control system including:

a control device configured to be inserted between the output shaft of the gearbox and a proximate end of the spindle, the control device including an electric circuit adapted to energize the electric motor by the DC power supply, an arrangement of parts between the output shaft and the proximate end of the spindle, the arrangement allowing limited mutual displacement between parts connected with the output shaft and parts connected with the proximate end of the spindle, a first switch in the electric circuit and arranged at the parts in such a way that when the parts reach at least one extreme position of their mutual displacement, the first switch will be actuated due to displacement caused by increasing torque in the spindle and thus interrupt the power supply to the motor.

10. A control system according to claim 9, including a rectifier diode provided in the electric circuit and connected in parallel with the first switch.

11. A control system according to claim 9, wherein the electric circuit of the control system includes a second switch, the first and second switches arranged for interrupting the power supply to the electric motor by opposite displacements of the parts of the control system at two opposing extreme positions of the parts, two rectifier diodes are provided in the control circuit in parallel with the first and second switches, one rectifier diode arranged at each of the first and second switches, where the rectifier diodes are arranged such that their directions of rectification of the current in the electric circuit are in mutually opposite directions.

* * * * *